United States Patent [19]
Fischer

[11] Patent Number: 5,822,209
[45] Date of Patent: Oct. 13, 1998

[54] METHOD AND SYSTEM FOR PRODUCING A STENCIL BY STORING COLOR FILES AND CREATING THE NEEDED BIT SEQUENCE

[75] Inventor: Hannes Fischer, Wörgl, Austria

[73] Assignee: Schablonentechnik Kufstein Aktiengesellschaft, Kufstein, Austria

[21] Appl. No.: 729,412

[22] Filed: Oct. 11, 1996

[30] Foreign Application Priority Data

Oct. 13, 1995 [EP] European Pat. Off. .............. 95116195

[51] Int. Cl.⁶ .............................. G06F 19/00; B41C 1/14
[52] U.S. Cl. .............................. 364/474.02; 364/474.08; 101/128.4
[58] Field of Search .................. 364/474.02, 470.04, 364/474.08, 468.24; 358/299; 101/128.4, 129; 219/121.69, 121.68; 395/107

[56] References Cited

U.S. PATENT DOCUMENTS

| | | | |
|---|---|---|---|
| 4,507,685 | 3/1985 | Kawamura | 358/283 |
| 4,972,323 | 11/1990 | Cauwet | 364/474.02 |
| 5,201,027 | 4/1993 | Casini | 101/128.4 |
| 5,605,097 | 2/1997 | Ruckl et al. | 101/128.4 |

FOREIGN PATENT DOCUMENTS

| | | | |
|---|---|---|---|
| A0293214 | 11/1988 | European Pat. Off. | H04N 1/40 |
| A0612181 | 8/1994 | European Pat. Off. | H04N 1/40 |
| A2136475 | 12/1972 | France | G06K 9/00 |
| 2645073 | 10/1990 | France | B41C 1/05 |
| A2199462 | 7/1988 | United Kingdom | H04N 1/46 |

*Primary Examiner*—Reba I. Elmore
*Assistant Examiner*—Steven R. Garland
*Attorney, Agent, or Firm*—Birch, Stewart, Kolasch & Birch, LLP

[57] ABSTRACT

A method and system for producing a rotating, clamped stencil includes producing a pattern in the surface of the stencil by means of an engraver by moving an engraving head of the engraver relative to the stencil. The engraving head is switched on and off by a control computer in coincidence with a predefined bit sequence which is generated from a byte sequence taken from a color file. The color file describes a pattern and is stored in a large-scale memory of a server. The server sends the color file containing the byte sequence relating to the engraving of the stencil to a further computer or to the control computer. This further computer or control computer creates the bit sequence assigned to this stencil. The result is a saving in computing time and memory capacity for the server. The bit sequence is created by the further computer or control computer only when the engraving of a stencil is actually to be carried out. The production of the bit sequence can also be carried out "on the fly."

20 Claims, 3 Drawing Sheets

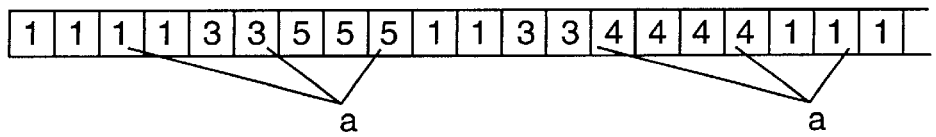
FIG. 1a
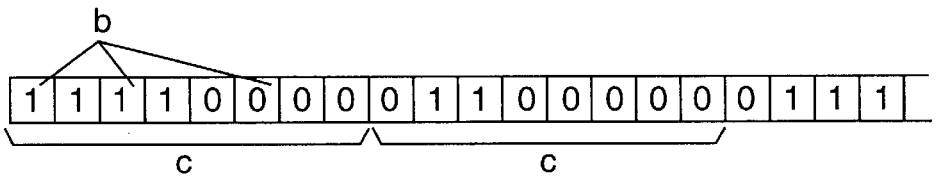
FIG. 1b
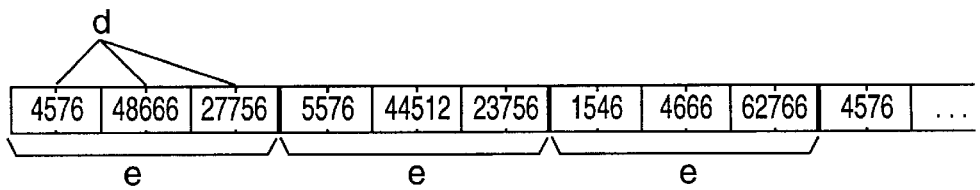
FIG. 2a
| FARB-NR.: | R | G | B |
|---|---|---|---|
| 1 | 32111 | 19176 | 23626 |
| | 35633 | 21555 | 28713 |
| 2 | 953 | 3455 | 61345 |
| | 2315 | 5888 | 63455 |
| .. | ... | ... | ... |
| | ... | ... | ... |
| .. | ... | ... | ... |
| | ... | ... | ... |
| 13 | 1236 | 43712 | 23626 |
| | 5525 | 57856 | 28713 |
FIG. 2b

5,822,209

METHOD AND SYSTEM FOR PRODUCING A STENCIL BY STORING COLOR FILES AND CREATING THE NEEDED BIT SEQUENCE

FIELD OF THE INVENTION

The invention relates to a method and for producing a rotating clamped stencil which can be used, for example, for printing paper or textiles. The stencil may be, for example, a screen printing stencil or a gravure printing stencil. It may consist of a hollow cylindrical rotary cylinder or a flat stencil element which, for the purposes of processing, is laid around a rotatable cylinder.

DESCRIPTION OF RELATED ART

In a conventional method, a pattern is produced in the surface of the stencil by an engraver. An engraving head of the engraver is moved in relation to the stencil, and is switched on and off by a control computer in coincidence with a predefined bit sequence. This bit sequence is generated from a byte sequence taken from a color file. The color file describes a pattern and is stored in a large-scale memory of a server. The color file can be created, for example, by scanning an artificial pattern original image point-by image point, for example, using an optical or mechanical method. However, the color file can also be created directly on a color monitor.

To produce the bit sequence for the purpose of engraving a respective stencil, a relatively long period of time is needed. Moreover, if a set of stencils necessary for creating a colored pattern reproduction includes a large number of stencils, the time requirement for the creation of the respective bit sequences increases further. On the other hand, the stencils belonging to a set of stencils are generally engraved one after the other using the bit sequences assigned to them in each case, so that it is not necessary for all the bit sequences to be immediately available. The central computer, which is used as the server, is thus quite unnecessarily blocked by the creation of the bit sequences for the respective stencils of a set of stencils and, during this time, cannot carry out any other work. The degree of utilization of the central computer is therefore relatively low.

SUMMARY OF THE INVENTION

It is an object of the present invention to provide a method and system for creating bit sequences which are necessary for engraving the respective stencils which are better coordinated with the actual working process for forming the respective stencils.

These and other objects of the present invention may be realized by providing a method and system for producing a rotating clamped stencil, in which a pattern is produced in the surface of the stencil by an engraver. An engraving head of the engraver is moved in relation to the stencil, is switched on and off by a control computer in coincidence with a predefined bit sequence which is generated from a byte sequence taken from a color file. The color file describes a pattern and is stored in a large-scale memory of a server. The server sends the color file containing the byte sequence relating to the engraving of the stencil to a further computer, and this further computer creates the bit sequence assigned to this stencil.

The central computer, operating as the server, is then freed from the creation of the respective bit sequences for the individual stencils. Moreover, it is possible to generate the respective bit sequences only when the stencils are actually being engraved. This results in savings, on the one hand, in operating time for the central computer or server and, on the other hand, in memory capacity in its large-scale memory is saved, since only the byte sequences containing the color files need to be stored there and not the bit sequences which are actually necessary for engraving the respective stencils. The bit sequences are generated by the further computer or control computer which may be arranged directly on the engraver, to be precise they are generated only when they are actually needed. For this purpose, the corresponding byte sequences can be called up from the large-scale memory of the central computer or, if they are located on removable large scale memories, can be transferred by pushing the large scale memory into the further computer or control computer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BREIF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1a shows a color file, consisting of a multiplicity of bytes, for a whole-tone format, each byte describing the color or color number of an image point;

FIG. 1b shows a bit sequence, generated from the color file according to FIG. 1a, for switching an engraver on and off;

FIG. 2a shows a color file, consisting of a plurality of bytes, for a half-tone format, in which in each case one image point is described by three color components R, G and B, to which, in each case, two bytes are assigned;

FIG. 2b shows a color palette, which contains, for each color or color number, upper and lower limit values for the color components R, G and B;

DETAILED DESCRIPTION OF THE PREFERRED EMBODIMENTS

Figure 2C:
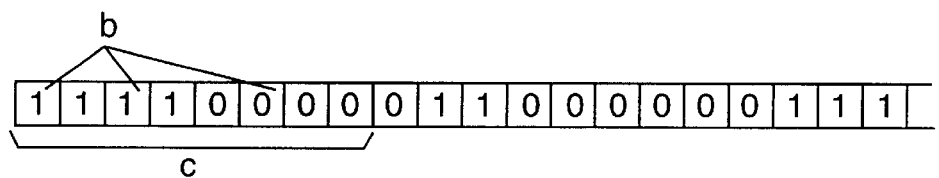
FIG. 2c shows a bit sequence, generated with the aid of the color file according to FIG. 2a and the color palette according to FIG. 2b, for switching the engraver on and off.

FIG. 1a symbolically illustrates the start of a color file which contains a picture-like motif as a stored data set. The format shown is the simplest format which is used for such a recording. In the case of this example, one byte is used as data storage space for each image point, and it is intended that this format be designated as the whole-tone format. In order to provide sufficient range using such a small memory requirement per pixel, the pattern must satisfy the precondition that the sum of the different color tones, including their intensities, does not exceed the number 255.

In the field of the color finishing (printing) of textiles, there are many patterns which correspond to this requirement. This is primarily because, in the case of many color systems which are used, for example, for reasons of color fastness, unsightly mixed colors are dispensed with. Since, for reasons of cost, reliance is placed on a small number of stencils, the economically processable patterns are those which consist of only 6 to 16 different colors.

The representation of a byte in this image is symbolized by boxes a, into which the value of one byte is entered. This value denotes the number of the color. For some applications, it is necessary to define how the color of a given number is to be composed from components. Other definitions are also necessary. If the pattern which is described by this file is to be output, for example, on a monitor screen, it is necessary to know which R, G, B intensities are to be associated with a specific byte value. In addition, it must be known how many image points or pixels or bytes form a pattern row, whether this pattern row is to be displayed horizontally or vertically on the monitor screen, how often, if necessary, the motif thus formed is to be repeated horizontally or vertically, etc.

For the purpose of engraving a stencil, on the other hand, it would not be absolutely necessary to know the exact composition of the color. However, it is important to know, for example, how many bytes of the file form an image point row, how often this image point row must be repeated on the circumference of a stencil, etc. In the case of the production methods which are common nowadays, it is often not possible during the production of a pattern on an engraving system to dispense with displaying it on a monitor, therefore, all this information, together with the color information, is most expediently placed in a file header. This header is not shown in FIG. 1a, but it has a defined format. The program controlling the engraving on an engraver is aware of this format and is therefore capable of extracting from the file header all the information which is necessary for the operation and reading-out of the pattern.

The engraver, for example, a laser engraver, must receive switching-on and switching-off signals for the laser during the engraving of a stencil, since, for example, a lacquer layer must be removed from the surface of a rotary screen or must be hardened, which can be carried out in a manner known per se by a laser beam. For the purpose of rapid data transfer, recourse is made here to the smallest logic unit which is capable of transporting a switch-on or switch-off command, and this is just one bit. Although it would be conceivable to use a byte (=8 bits) or a nibble (=4 bits) for a switch-on or switch-off command, for the reason mentioned this is not the aim or is the aim only in very infrequent cases (long, severely disturbed data lines from the control computer to the engraving machine) The task is therefore to form from the whole-tone format shown in FIG. 1a bit sequence - the so-called engraving format - which is suitable and correct for the respective engraving task.

This format is shown in FIG. 1b. In the case of this example, in contrast to FIG. 1a, a dedicated box b is used for each bit. One byte is then formed by eight successive boxes b and is identified by the sections c. In addition, it is assumed that the engraving format for the stencil is intended to be produced with the number 1, that is to say for the first stencil of the set or the first color. A bit may only be set, that is to say obtain the value 1, if the value content of a byte of the whole-tone format (FIG. 1a) corresponds exactly to the number 1. In the other case, when the value of a byte in the whole-tone format does not correspond to the number (here 1) of the stencil which is about to be engraved, then that bit in the engraving format which corresponds to this byte must be set to the value 0.

In other words, a logic AND operation is carried out between the number of the desired color and the color information contained in the byte. According to the invention, this conversion of the byte sequence of FIG. 1a to the bit sequence of FIG. 1b takes place in the control computer 16 of the engraving system or on a further computer, which is not identical to the computer of the CAD system which is pre-processing the pattern, but which can most certainly be connected to the latter via a data network line or a bus line. The number of the desired color is entered into the control computer 16 or further computer via a keyboard.

In addition to the previously discussed pattern reproductions and the files associated with these for the storage of the pattern data, there are cases in which the color reproduction at each individual image point is intended to be carried out by mixing different amounts of color or by means of the output of different intensities of three different color components. This is a common process, for example, in the case of a correspondingly multicolored display of a pattern on a monitor. In the case of textile printing colors, too, such a mixture is sometimes the aim in spite of all the difficulties involved with the formation of mixed colors.

A set of stencils which consists of three to six individual stencils is able to reproduce a highly colored pattern using this small number of stencils. Since, in spite of its high color, such a pattern reproduction gives rise to only low investment costs, it is cost-effective. The color system of the printing colors must be suitable for such a mixed-color formation. Such a pattern then needs very much more color information and, therefore, a greater memory capacity must be available for one image point.

Therefore, FIG. 2a shows once more the part of a color file which describes a pattern, but here a monitor image which contains a large number of different color values and intensities is described. On the monitor, the colors, as is known per se, are represented by the three color components R(ed), G(reen), B(lue), the intensity of each of these three color components being able to be set between a minimum color value and a maximum color value. Further, it is intended to be assumed that a dataword of length two bytes is available for describing each intensity of the three components, and that the intensities can therefore be described by values between 0 and 65535.

These colors are intended to be transferred to a set of stencils, which consists of 13 stencils and with which, therefore, 13 different colors can be printed. In each case three 2-byte-long datawords d are combined to form one data set e, which precisely describes the three color components R, G, B in their respective intensity. The format of the data in this color file is intended to be designated as the half-tone format, since, using this type of data recording, it is possible to characterize colors having a very large number of hues and a large number of intensities - so-called half-tones. However, it is still not possible to form the engraving format using this information alone.

In order to produce the engraving format, it is necessary to define colors, for example in a table, by means for the statement of limiting values for the individual color components. Such a table or color palette is shown in FIG. 2b. This contains, for each of the printing colors listed, an upper and a lower limiting value which must be transgressed if a hue is intended to be assigned to the printing color listed. A data set e of the half-tone format (FIG. 2a) is then replaced by one of the color numbers 1 to 13 of the table if the intensity of each color component of this data set e is located within all the component limiting values of this color.

If a data set which describes the color of an image point cannot be assigned to any of the 13 colors, it may then receive, for example, the color number of the image point which could last be assigned. This is of importance in the case of mixed hues in the transition region between two hues. If the color number which is obtained in this manner agrees with the number of the stencil which is about to be engraved or of the stencil for which the engraving format is being produced, then the bit representing the data set is set to 1, otherwise it is set to 0. The corresponding bit sequence is shown in FIG. 2c. Here, too, the conversion of the halftone format (FIG. 2a) into the engraving format (FIG. 2c) is executed according to the invention by the control computer 16 of the engraver or by a further computer which is interlinked with the latter.

For this purpose, the color palette according to FIG. 2b is stored in the control computer or further computer and the number (e.g., 13) of the desired color is also entered. If the operating speed of the control computer 16 or of the computer combination of this and the further computer is sufficient, the comparison of the half-tone format with the color component limiting values of the stencil which is about to be engraved is best carried out during the engraving - that is to say "on the fly". The comparison of the color intensities with the limiting values can be carried out very rapidly in the case of "on the fly" scanning, since each data set e of the half-tone format only has to be compared with the 3 times 2 limiting values for the color components of the stencil which is about to be engraved.

However, in this case, it is not so simple to decide to which color an image point is to be allocated if the component intensities do not fit into the table. This color point is lost or leaves a white point behind on the substrate to be printed. On the other hand, if temporary memory files are produced for the 13 stencils, then the loss of one image point is less probable, since this is replaced by the color (=stencil) of the last assigned image point. The risk of forming white flecks in the transition zones from one color to the other is therefore lower.

Figure 3A:
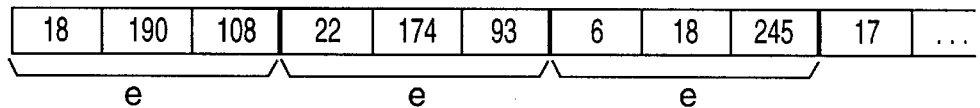
FIG. 3a shows a further color file in the halftone format, which assigns to each image point three bytes, of which in each case one is provided for one of the three color components R, G and B of the image point.

Shown in FIG. 3a is a further pattern-describing part of a color file in the half-tone format. It is assumed here that the intensity values correspond to the normal monitor intensities, that is to say they have values which lie between 0 and 255. Furthermore, it is presupposed here that, using this file, a half-tone stencil set which consists of only three stencils is to be produced. This set of stencils must then produce mixed colors during the subsequent printing process. one stencil is then produced for one of the three color components R, G, B. Since the color intensity values do not exceed that value which can be represented by one byte, one data set e needs only three bytes of memory capacity here, namely one byte for each of the three color components R, G, B. During the engraving of the red stencil that byte which describes the intensity of the red component for each image point to be produced on the stencil is read out. The same is true for the other color components.

Figure 3B:
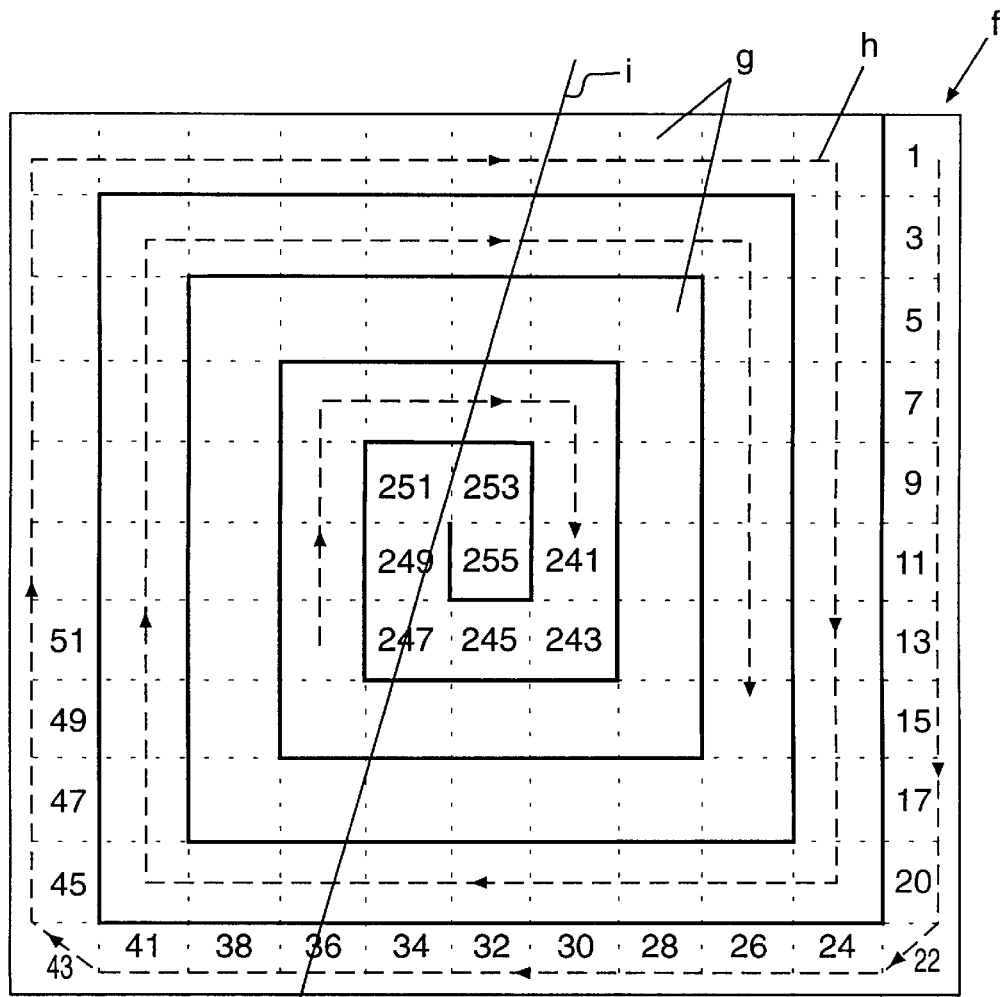
FIG. 3b shows a gray tone reference cell having a plurality of color or individual cells.

FIG. 3b shows a further part of the information which is important for the processing of the data set of FIG. 3a. This is the gray tone reference cell of a half-tone grid. Such reference cells can be defined in separate files. In the header of the data set of FIG. 3a, there is then only an indication of the correct reference cell and the correct reference cell file. This gray tone reference cell consists here of 11 times 11 color or individual cells g. These individual cells g contain, for example in a rectangular spiral h running towards the center, monotonically increasing intensity values from 1 to 255. Since, in this example, there are fewer color or individual cells than intensity values, the intensity values increase from cell to cell by a value 2 and, after every ninth cell, by the value 3. Both the representation of the gray tone reference cell and that of the color or individual cell are to be understood symbolically.

With its individual cells, the gray tone reference cell serves as a type of comparison original and is stored only temporarily in the control computer 16 or further computer. It is the smallest part of the half tone grid on which the pattern image is desired to be based and which is necessary for assigning the pattern data on a half-tone-like grid.

The half-tone grid is rotated with respect to the circumferential direction or the axial direction for several reasons (e.g., avoidance of moirè, avoidance of seams) . Due to this rotation, the reference cell of the half-tone grid must also be thought of as rotated with respect to the circumferential direction of the stencil to be engraved. The focused, engraving laser beam moves over the stencil on a track of closely adjacent helical lines. Therefore, the laser beam has, in relation to the reference cell f, virtually the same inclination which the circumferential direction assumes. A section of such a helical line is designated as i. The control computer of the engraver or a further computer assigned to this section follows, by means of a corresponding calculation, the track of the focused laser beam through the reference cell f and its individual cells g, and also the intensity values which are to be lifted from the half-tone file (FIG. 3a) for the respectively current image point.

Each time that the laser beam dips into an individual cell g, the intensity value of the cell is compared with the intensity value of the image point to be engraved. If the intensity value from the half-tone file is greater than that of the individual cell g, the laser is then switched on or remains switched on. If, on the other hand, the intensity value from the halftone file is smaller than that of the individual cell g, then the laser is switched off or remains switched off. If the grid assignment is not carried out "on the fly" but beforehand, and if a temporary file in which the bit sequence of the engraving format is stored is formed, then a bit is set to 1 in a quite analogous manner if the laser were to be switched on or were to remain switched on, vice versa. Here, too, the gray tone reference cell according to FIG. 3b is stored in the control computer 16 or further computer. In addition, it is possible to communicate to the computer (also via manual entry) information regarding for which color components R, G, B a stencil is to be produced or engraving bit sequence is to be created.

Figure 4:
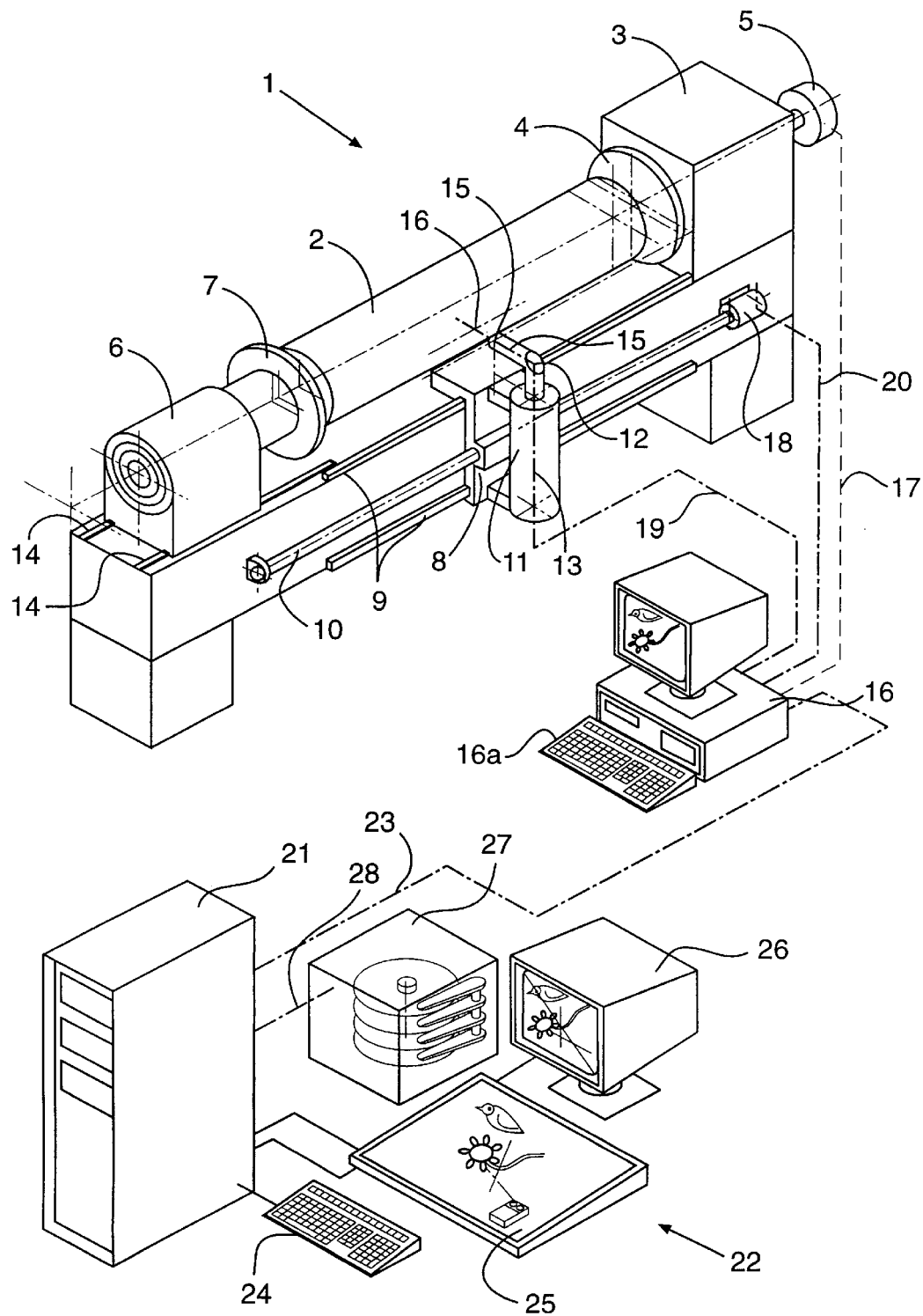
FIG. 4 shows a device for implementing the method.

FIG. 4 shows a laser engraver 1 known per se. On the latter, a stencil 2 to be engraved is clamped between two supporting cones, the headstock supporting cone 4 and the tailstock supporting cone 7. The tailstock 6 serves for the rotatable mounting of the tailstock supporting cone 7 and the headstock 3 drives the headstock supporting cone 4 with the aid of a motor, which is not visible. An encoder 5 is used for the generation of pulses which correspond to the respective rotary motion of the supporting cones 4, 7. A slide 8 is moved parallel to the axis of the stencil 2 on guides 9. A threaded spindle 10 is used to drive this slide 8. A laser 11, which is mounted on the slide 8, emits a laser beam 13 which is deflected through 90 degrees by a deflecting mirror 12 and is focused at 16 by a lens system 15.

The surface of the stencil 2 is covered with a light-sensitive lacquer. The lacquer either is hardened by the action of the laser beam or is removed at the exposed points. The tailstock 6, together with the tailstock supporting cone 7, can be displaced on guides 14 and, in this way, the tailstock supporting cone 7 can be set to the respective length of the stencil 2.

A control computer 16 is assigned to the laser engraver 1. This control computer 16 receives the pattern data from the server 21 of the CAD system 22 via the data line 23. The pattern data consist of the numeric or byte sequence, already described many times, for the stencil numbers, which can be combined with half-tone information. From these pattern data, the control computer 16 generates the respective bit sequence.

In the case of flat stencils, a bit in this bit sequence receives the value 1 if the corresponding pattern point on the stencil 2 is to be engraved. If the pattern point is not to be engraved, the associated bit is allocated the value 0.

In the case of half-tone stencils, the stencil number and, additionally with the aid of the half-tone conversion table according to FIG. 2b, the half-tone value are determined from one value of the numeric sequence. The respective bit sequence is fed to the laser 11 via a power converter, not shown in any more detail, the laser being switched on or off in accordance with this bit sequence. By means of this process, the pattern is produced on the stencil 2.

The control computer 16 also determines when the stepping motor 18 must execute the next step. The necessary stepping pulses are transmitted to the stepping motor 18 via the line 20 and a power amplifier, likewise not shown in any more detail. The stepping motor 18 drives the threaded spindle 10 and in this way moves the slide 8 with the laser 11. The CAD system shown here further comprises a keyboard 24, a digitizer 25 for the entry of graphic data, and the monitor screen 26.

A large-scale memory 27 is used for storing image data, which are transmitted to the large-scale memory 27 or to the server 21 via the bidirectional data line 28. In the large-scale memory 27, it is possible to store the color files according to FIGS. 1a, 2a and 3a temporarily, before they are transferred to the control computer 16 for the purpose of creating the respective bit sequences according to FIGS. 1b, 2a and the bit sequence according to the third exemplary embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A method of producing a rotating, clamped stencil on which a pattern is produced by a patterner comprising the steps of:
   moving a patterning head of the patterner relative to the stencil;
   switching the patterning head on and off by a control computer in coincidence with a predefined bit sequence which is generated form a byte sequence taken from a color file which describes a pattern and is stored in a large-scale memory of a server; and
   sending the color file containing the byte sequence relating to the patterning of the stencil from the server to a further computer and creating the bit sequence assigned to this stencil via the further computer, wherein each byte of the byte sequence contains information about the color and the creating step includes carrying out a logic AND operation between this color information and information about a desired color, which is entered into the further computer.

2. The method according to claim 1, further comprising a rotary stencil as the stencil.

3. The method according to claim 1, further comprising using the control computer as the further computer.

4. A method of producing a rotating, clamped stencil on which a pattern is produced by a patterner comprising the steps of:
   moving a patterning head of the patterner relative to the stencil;
   switching the patterning head on and off by a control computer in coincidence with a predefined bit sequence which is generated from a byte sequence taken form a color file which describes a pattern and is stored in a large-scale memory of a server;
   sending the color file containing the byte sequence relating to the patterning of the stencil from the server to a further computer and creating the bit sequence assigned to this stencil via the further computer, wherein the color file contains, for each image point, at least three datawords which describes the color components of said image point; and
   checking to see whether at least three data words respectively lie within limiting values which describe the color which is about to be patterned, which is stored within a color palette, and producing the bit sequence if all three color components respectively lie within these limiting values.

5. The method according to claim 4, wherein each byte of the byte sequence contains information about the color and the creating step includes carrying out a logic AND operation between this color information and information about a desired color, which is entered into the further computer.

6. The method according to claim 4, further comprising storing the color palette in the further computer and supplying a number of the color to be patterned to the further computer.

7. The method according to claim 4, wherein the color palette contains upper and lower limiting values for each color component which are assigned to a number of the color.

8. A method of producing a rotating, clamped stencil on which a pattern is produced by a patterner comprising the steps of:
   moving a patterning head of the patterner relative to the stencil;
   switching the patterning head on and off by a control computer in coincidence with a predefined bit sequence which is generated from a byte sequence taken from a color file which describes a pattern and is stored in a large-scale memory of a server;
   sending the color file containing the byte sequence relating to the patterning of the stencil from the server to a further computer and creating the bit sequence assigned to this stencil via the further computer, wherein the color file contains, for each image point, at least three datawords which describe the color components of said image point; and
   setting one of the color components in the bit sequence if a value of the data for this color component is greater than a value of a color cell (g) of gray tone reference cell (f).

9. The method according to claim 8, wherein the gray tone reference cell (f) is stored in the further computer.

10. The method according to claim 8, further comprising supplying the further computer information about for which of the color components the bit sequence is to be created.

11. A system for producing a rotating, clamped stencil on which a pattern is produced by patterner comprising:
- means for moving patterning head of the patterner relative to the stencil;
- a control computer for switching the patterning head on and off in coincidence with a predefined bit sequence which is generated from a byte sequence taken from a color file which describes a pattern and is stored in a large-scale memory of a server; and
- a computer, receiving the color file containing the byte sequence relating to the patterning of the stencil from the server, creating the bit sequence assigned to this stencil, wherein each byte of the byte sequence contains information about the color and the computer performs a logic AND operation between this color information and information about the desired color.

12. The system according to claim 11, wherein said stencil is a rotary stencil.

13. The system according to claim 11, wherein said control computer is the further computer.

14. A system for producing a rotating, clamped stencil on which a pattern is produced by patterner comprising:
- means for moving patterning head of the patterner relative to the stencil;
- a control computer for switching the patterning head on and off on coincidence with a predefined bit sequence which is generated from a byte sequence taken from a color file which describes a pattern and is stored in a large-scale memory of a server; and
- a computer, receiving the color file containing the byte sequence relating to the patterning of the stencil from the server, creating the bit sequence assigned to this stencil, wherein the color file contains, for each image point, at least three datawords which describe the color components of said image point, wherein said computer checks to see whether at least three data words respectively lie within limiting values which describe the color which is about to be patterned, which is stored within a color palette, and produces the bit sequence if all three color components respectively lie within these limiting values.

15. The system according to claim 14, wherein each byte of the byte sequence contains information about the color and the computer performs a logic AND operation between this color information and information about the desired color.

16. The system according to claim 14, wherein said computer stores the color palette and receives a number of the color to be patterned.

17. The system according to claim 14, wherein the color palette contains upper and lower limiting values for each color component which are assigned to a number of the color.

18. A system for producing a rotating, clamped stencil on which a pattern is produced by patterner comprising:
- means for moving patterning head of the patterner relative to the stencil;
- a control computer for switching the patterning head on and off in coincidence with a predefined bit sequence which is generated from a byte sequence taken from a color file which describes a pattern and is stored in a large-scale memory of a server; and
- a computer, receiving the color file containing the byte sequence relating to the patterning of the stencil from the server, creating the bit sequence assigned to this stencil, wherein the color file contains, for each image point, at least three datawords which describes the color components in the bit sequence if a computer sets one of the color components in the bit sequence if a value of the data for this color component is greater than the value of a color cell (g) of the gray tone reference cell (f).

19. The system according to claim 18, wherein said computer stores the gray tone reference cell (f).

20. The system according to claim 18, wherein said computer further receives information about which of the color components the bit sequence is to be created.

* * * * *